(12) United States Patent
Vendrig et al.

(10) Patent No.: US 8,374,440 B2
(45) Date of Patent: Feb. 12, 2013

(54) IMAGE PROCESSING METHOD AND APPARATUS

(75) Inventors: Jeroen Vendrig, Liberty Grove (AU); Anton Van den Hengel, Trinity Gardens (AU); Anthony Dick, Maylands (AU)

(73) Assignee: Canon Kabushiki Kaisha, Tokyo (JP)

(*) Notice: Subject to any disclaimer, the term of this patent is extended or adjusted under 35 U.S.C. 154(b) by 1462 days.

(21) Appl. No.: 11/954,164

(22) Filed: Dec. 11, 2007

(65) Prior Publication Data
US 2008/0152236 A1 Jun. 26, 2008

(30) Foreign Application Priority Data

Dec. 22, 2006 (AU) ................................. 2006252252

(51) Int. Cl.
*G06K 9/62* (2006.01)
*G06K 9/34* (2006.01)
*G06K 9/64* (2006.01)
*G06K 9/68* (2006.01)

(52) U.S. Cl. ......... 382/224; 382/159; 382/173; 382/217

(58) Field of Classification Search .................. 382/159, 382/160, 224–228, 173, 180, 217–223
See application file for complete search history.

(56) References Cited

U.S. PATENT DOCUMENTS

| | | | | |
|---|---|---|---|---|
| 5,563,988 A * | 10/1996 | Maes et al. | ..................... | 345/421 |
| 6,505,299 B1 | 1/2003 | Zeng et al. | ..................... | 713/160 |
| 6,532,022 B1 * | 3/2003 | Ahmad | ......................... | 345/629 |
| 6,545,706 B1 * | 4/2003 | Edwards et al. | .............. | 348/169 |
| 6,987,883 B2 | 1/2006 | Lipton et al. | ................... | 382/173 |
| 7,418,134 B2 | 8/2008 | Schwartz et al. | ............. | 382/173 |
| 7,536,032 B2 * | 5/2009 | Bell | ............................ | 382/107 |
| 7,809,167 B2 * | 10/2010 | Bell | ............................ | 382/107 |
| 2003/0095701 A1 * | 5/2003 | Shum et al. | .................. | 382/155 |
| 2004/0151374 A1 | 8/2004 | Lipton et al. | .................. | 382/181 |
| 2004/0228530 A1 | 11/2004 | Schwartz et al. | ............. | 382/173 |
| 2006/0193516 A1 * | 8/2006 | Toyama et al. | ............... | 382/173 |
| 2007/0274402 A1 * | 11/2007 | Ibrahim et al. | ........... | 375/240.29 |
| 2008/0130948 A1 * | 6/2008 | Ozer | ............................ | 382/103 |
| 2008/0152236 A1 * | 6/2008 | Vendrig et al. | ................ | 382/224 |
| 2008/0195387 A1 * | 8/2008 | Zigel et al. | .................... | 704/236 |
| 2008/0247640 A1 | 10/2008 | Ukita | ............................ | 382/165 |
| 2008/0317357 A1 * | 12/2008 | Steinberg et al. | ............ | 382/209 |
| 2011/0043699 A1 * | 2/2011 | Springett et al. | .............. | 348/571 |

FOREIGN PATENT DOCUMENTS

| | | |
|---|---|---|
| JP | 2002-112080 | 4/2002 |
| JP | 2006-039689 | 2/2006 |

OTHER PUBLICATIONS

Australian Official Communication dated May 18, 2009, Regarding Patent Application No. 2006252252. Japanese Office Action issued in the counterpart application No. 2007-333203 dated Aug. 6, 2010—3 pages.
Takekazu Kato et al., "Integration Between Background Subtraction and Color Detection Based on Nearest Neighbor Classifier," IPSJ SIG Technical Report 2004-CVIM-142, vol. 2004, No. 6, p. 31-36, Information Processing Society of Japan, published on Jan. 23, 2004.

* cited by examiner

*Primary Examiner* — Aaron W Carter
(74) *Attorney, Agent, or Firm* — Fitzpatrick, Cella, Harper & Scinto (57) ABSTRACT

A method (100) is disclosed of classifying elements in a region within a frame (410). The method (100) creates (145) a background model (150) of at least said region based on a statistical function applied to features of elements of said region in a set of frames. A mapping (130) of features to labels is also received. A difference measure comprising a plurality of difference values is then calculated based on features of elements in the region and features of the background model (150). The method (100) then classifies (180) elements based upon the difference measure and the mapping (130).

13 Claims, 7 Drawing Sheets

IMAGE PROCESSING METHOD AND APPARATUS

CROSS-REFERENCE TO RELATED PATENT APPLICATIONS

This application claims the right of priority under 35 U.S.C. §119 based on Australian Patent Application No. 2006252252, filed Dec. 22, 2006, which is incorporated by reference herein in its entirety as if fully set forth herein.

FIELD OF THE INVENTION

The current invention relates generally to video processing and, in particular, to the separation of foreground from a background in video.

BACKGROUND

Video cameras, such as Pan-Tilt-Zoom (PTZ) cameras, are omnipresent nowadays, mostly for surveillance purposes. The cameras capture more data (video content) than human eyes can process. Automatic analysis of video content is therefore needed.

An essential step in the processing of video content is the segmentation of video data into foreground and background. Such segmentation allows for further analysis, such as detection of specific foreground objects, or tracking of moving objects. Such further analysis may, for example, result in an alert to a security guard.

Automatic analysis is also relevant to PTZ cameras. PTZ cameras may change their field of view without human intervention based on preset orientations, or even based on the observed video content. For example, when tracking a walking person, the camera may pan to keep the person within the field of view.

A common approach to foreground/background segmentation is background subtraction. For example, the median pixel value for a position in a scene may be compared against the current pixel value at that position. If the current pixel value is similar to the median pixel value, the pixel is considered to be belonging to the background, otherwise the pixel is considered to be belonging to a foreground object. The challenge for such approaches is to define similarity. Techniques from the field of machine learning cannot be applied immediately to solve this challenge, because such techniques are dependent upon the availability of sufficient training data. The generation of training data is a significant expense in terms of human resources.

Although more complex background modelling methods are known in the art, these methods are computationally expensive, and their memory requirements do not allow the methods to be embedded on devices such as cameras.

SUMMARY

An object of the present invention is to substantially overcome or, at least ameliorate, one or more disadvantages of existing arrangements.

According to a first aspect of the present disclosure, there is provided a method of classifying elements in a region within a frame, said method comprising the steps of:
creating a model of at least said region based on a statistical function applied to features of elements of said region in a set of frames;
receiving a mapping of features to labels;
calculating a difference measure comprising a plurality of difference values based on features of elements in said region and features of said model; and
classifying said elements based upon said difference measure and said mapping.

According to a second aspect of the present disclosure, there is provided a method of selecting training examples from a frame comprising elements, said method comprising the steps of:
creating a model for respective positions of said frame from a set of frames;
receiving from a user a selection of elements that are certain to belong to one of a plurality of classes;
determining a classification for elements excluded from said selection based on features of said elements excluded from said selection and said model; and
selecting at least elements with a low likelihood of accurate classification as training examples.

According to another aspect of the present disclosure, there is provided an apparatus for implementing the aforementioned method.

Other aspects of the invention are also disclosed.

BRIEF DESCRIPTION OF THE DRAWINGS

One or more embodiments of the present invention will now be described with reference to the drawings, in which.

DETAILED DESCRIPTION INCLUDING BEST MODE

A camera may be used to capture video frames representing the visual content appearing in the field of view of the camera. In the case of a pan-tilt camera, the orientation of the camera may be altered to change the field of view. The camera may therefore capture video frames of a scene, with the scene being larger than the field of view of the camera.

Each frame captured by the camera comprises more than one visual element. A visual element may be defined as an image sample. In one embodiment the visual element is a pixel, such as a Red-Green-Blue (RGB) pixel. In another embodiment each visual element comprises a group of pixels. In yet another embodiment the visual element is an 8 by 8 block of transform coefficients, such as Discrete Cosine Transform (DCT) coefficients as acquired by decoding a motion-JPEG frame, or Discrete Wavelet Transformation (DWT) coefficients as used in the JPEG-2000 standard.

Separation of the visual elements appearing in video frames into foreground and background may be achieved by comparing the captured visual elements at a point in time to visual elements at a same locale in the scene, but captured at different points in time.

In practice, foreground/background separation is performed on frames, or regions in frames. Such regions may have been identified using knowledge about the domain. For example, to save processing power and energy consumption, a user may specify that no foreground/background separation is to be performed on a part of the scene. The reason for such an exclusion may be that only a part of the scene is a restricted area, while the other part is public space.

A background model is used to represent the visual elements within the scene captured at different points in time. The background model is a representation of the non-transient parts visible in the scene. Accordingly, the background model describes a scene containing no foreground objects. In a simple case, a first frame may be used as the background model. If the frame contains no foreground objects, that first frame is an accurate background model as that first frame is a representation of the non-transient parts visible in the scene. However, using the first frame as the background model is not robust against gradual changes within the scene, and illumination effects. Also, the assumption that the first frame contains no foreground objects is generally not realistic. In the case of pan-tilt cameras, the first frame also does not cover the entire scene.

A better approach to modelling the background is to use a statistical function of the data that represent the scene. In one embodiment, fixed values that are derived from a statistical function of the frame data, such as the average or median of the data, are used to construct the background model. Accordingly, a visual element in the background model may have a fixed value of R=100, G=150, B=200, or luminance=123.45, or transform coefficients {−50, 28, 76, 38}.

The individual values for the channels or coefficients in the background model may be computed individually. That is, the total representation of the visual element in the background model may not relate to any one specific visual element in the history used as input to the statistical function.

In another embodiment, a distribution is computed for each visual element in the background model. For example, the mean of the colour channels or of the transform coefficient may be used, together with a standard deviation of the same. This allows for a more dynamic interpretation of a visual element, because an observed value different to, but sufficiently similar to the mean may be considered to belong to the background model. In yet another embodiment, the background can be multi-modal. Consider the case of an elevator light which may be on or off. In such a case a mean/standard deviation pair is used to represent the "on" state of the light, and another pair is used to represent the "off" state of the light.

In all cases the background is modelled, but with different visual characteristics. In yet another embodiment, all visual content (including foreground) is modelled into the background model, and it is decided later, based on this background model, which visual elements are considered to represent foreground, and which content is considered to represent the background. The standard deviation of each distribution may for example be used to make this decision, with visual elements having a standard deviation greater than a threshold considered to represent foreground. The remainder of the visual elements are considered to represent the background.

Because the background model has a life which exceeds the duration of a single frame, and since the background model covers the entire scene, rather than just the present field of view, the part of the scene modelled by the background model is referred to as the background plane. Every visual element in a frame corresponds to a position in the background plane.

The idea of background modelling and background subtraction has been studied in the art. One of the key problems is setting a threshold for the extent the visual elements may depart from the model before such elements are considered as representing foreground. When a visual element is modelled by one feature, e.g. the intensity, the problem of finding a suitable threshold may be solved by trial and error. For accurate background modelling, however, more features are needed. For example, for a visual element that is an 8 by 8 DCT block of coefficients, 64 features (the AC and DC coefficients) are available. Although not all features have to be used in practice, even when using a small subset of the available features, say 12, the number of dimensions and the possible interactions are too excessive to be solved by mere trial and error. A multi-dimensional classifier is needed, generally referred to as machine learning methods. Multi-dimensional classifiers such as Support Vector Machines, k-Nearest Neighbour or neural networks, have been successfully applied to problems with a high dimensional feature space. A machine learning method produces a model comprising knowledge about the characteristics of classes extracted from examples of the classes. Applied to the problem of foreground/background separation, the classes are "foreground" and "background".

It is desirable to use computationally efficient methods with low memory usage in order to separate foreground from the background. To this end, a simple background model with a complex interpretation of the differences between an incoming frame and the background model are used. The use of blocks of pixels as visual elements, and the use of blocks of transform coefficients as features for the background model, allow for fast processing, especially if it means that no further decoding of the transform coefficients is necessary. However, it does mean that a high-dimensional feature space, in practice up to 64 dimensions, needs to be supported.

Even though a simple background model is fast and memory efficient, in its conventional usage a simple background model is less accurate than some computationally expensive background models with large memory usage. The complex interpretation of the differences between an incoming frame and the background model used in the present disclosure increases the accuracy of the separation of foreground from the background such that the quality of results are similar to the quality achieved through using most complex background models. Although the interpretation of the differences is complex, as will be described in detail below, the execution of the interpretation of the differences is computationally very efficient.

Multi-dimensional classification methods require two stages: a training stage to create a machine learning model, and a classification stage, which uses the machine learning model. In the present disclosure the training stage is performed in advance. Preferably, the training stage is performed once on a training scene and the machine learning model created may be provided to a large number of systems, e.g. on a memory chip on a camera or on a compact disc, where the classification stage is to be performed. The training scene does not have to be related to the scene(s) to be classified. For example, the training scene may be an office, and the scene to be classified may be in a house.

In another embodiment, the training stage is performed on the scene where the classification stage is to be performed, so that the training examples used to create the machine learning model reflects the characteristics of the scene well.

The multi-dimensional classifier is first described, followed by the manner in which examples are selected for use to train the multi-dimensional classifier.

Figure 1:
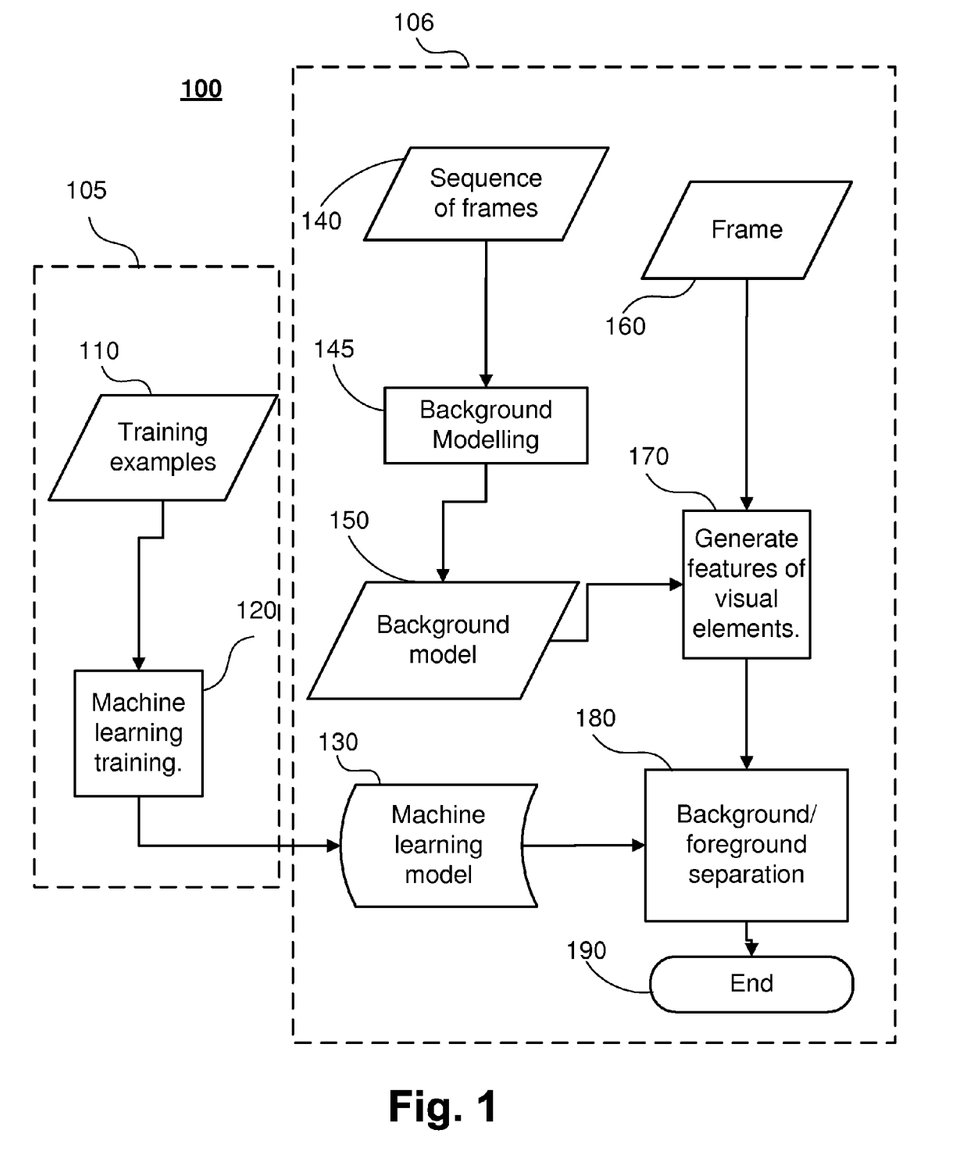
FIG. 1 shows a schematic flow diagram of the method of separating visual elements appearing in a region of a frame as representing foreground objects or background.

FIG. 1 shows a schematic flow diagram of a method 100 of separating visual elements appearing in a region of a frame 160 as representing foreground or background. The method 100 comprises a training stage 105 and a classification stage 106.

Figure 6:
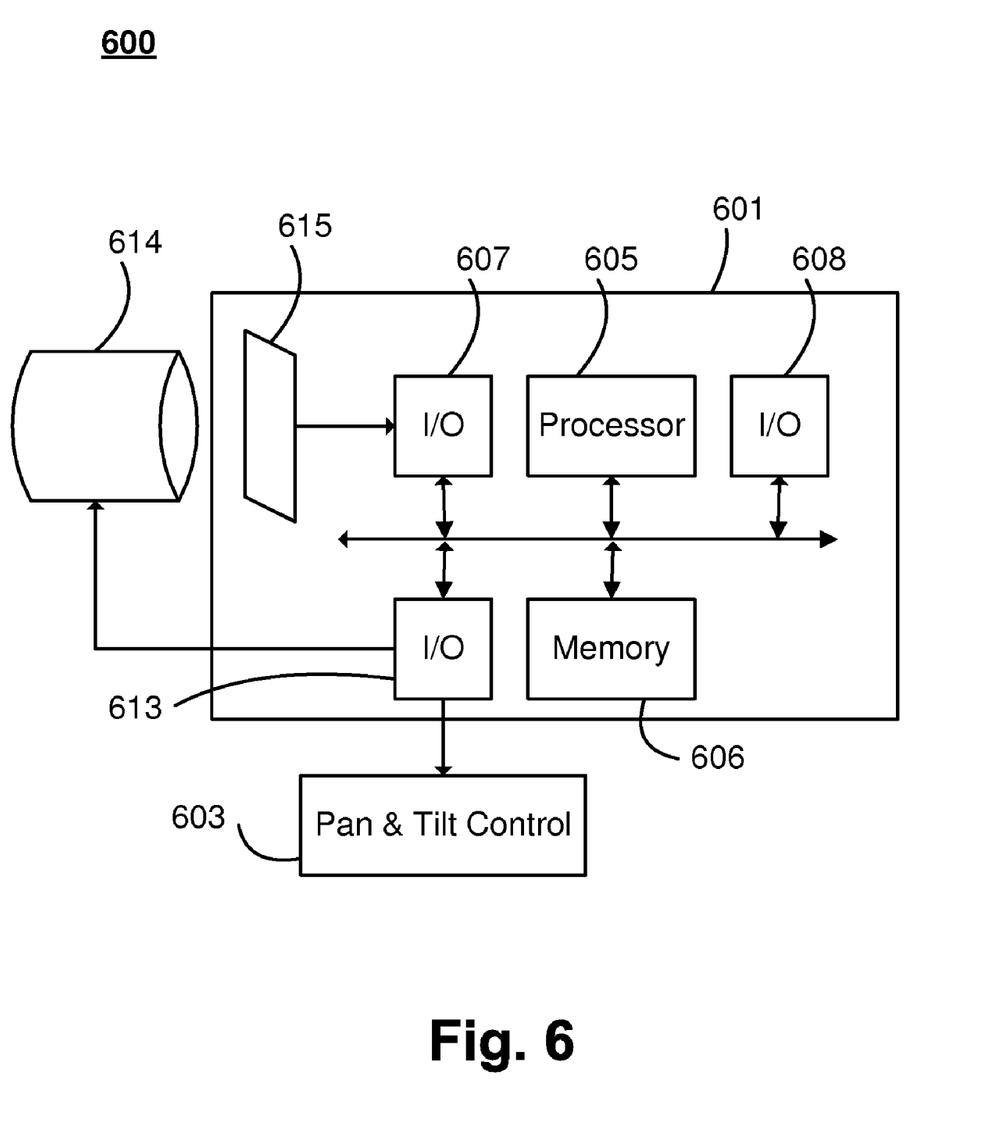
FIG. 6 shows a schematic block diagram of a camera upon which the methods of FIGS. 1 and 2 may be practiced.

The classification stage 106 is preferably performed in a camera. The training stage 105 may be performed in a camera, or by a personal computer linked to a camera. FIG. 6, shows a schematic block diagram of a camera 600 upon which the classification stage 106 and the training stage 105 may be practiced. Stages 105 and 106 are implemented as software executable within the camera 600.

The camera 600 is a pan-tilt-zoom camera (PTZ) formed by a camera module 601, a pan and tilt module 603, and a lens system 614. The camera module 601 typically includes at least one processor unit 605, and a memory unit 606, a photosensitive sensor array 615, an input/output (I/O) interfaces 607 that couples to the sensor array 615, an input/output (I/O) interfaces 608 that couples to a communications network 620, and an interface 613 for the pan and tilt module 603 and the lens system 614. The components 605, to 613 of the camera module 601 typically communicate via an interconnected bus 604 and in a manner which results in a conventional mode of operation known to those in the relevant art.

The pan and tilt module 603 includes servo motors which, in response to signals from the camera module 601, moves the camera module 601 about the vertical and horizontal axes. The lens system 614 also includes a servo motor which, in response to signals from the camera module 601 to change the focal length of the lens system 614.

The machine learning model may be communicated between a camera performing the learning stage 105 to a camera performing the classification stage 106 through the communications network 620, or transferred through a memory medium.

In the training stage 105 of the method 100 training examples 110 are fed to a multi-dimensional classifier 120, e.g. Support Vector Machine, which creates a machine learning model 130. Essentially, the machine learning model 130 is a mapping from features of visual elements to a label, such as "background" or "foreground".

In the classification stage 106, a sequence or set of frames 140 captured by the camera 500 are used to create a background model 150 in a background modelling step 145 based on a statistical function applied to features of elements. In one implementation the features of elements are averaged over the set or sequence of frames 140 to derive the background model 150. The region in a captured frame 160 is then presented to the camera 500 for foreground/background separation. In step 170, a difference measure between features of each visual element appearing in the region in the captured frame 160 and corresponding features in the background model 150 is calculated. The difference measure express the correspondence between the visual elements in the region in the captured frame 160 and the background model 150 at corresponding positions in the background plane.

In step 180, the foreground/background separation is performed based on the feature values computed in step 170. The feature values are used as input to the machine learning model 130, and a label is output for each visual element in the region in the captured frame 160. In one arrangement, the label indicates whether the visual element belongs to foreground or not.

Figure 7:
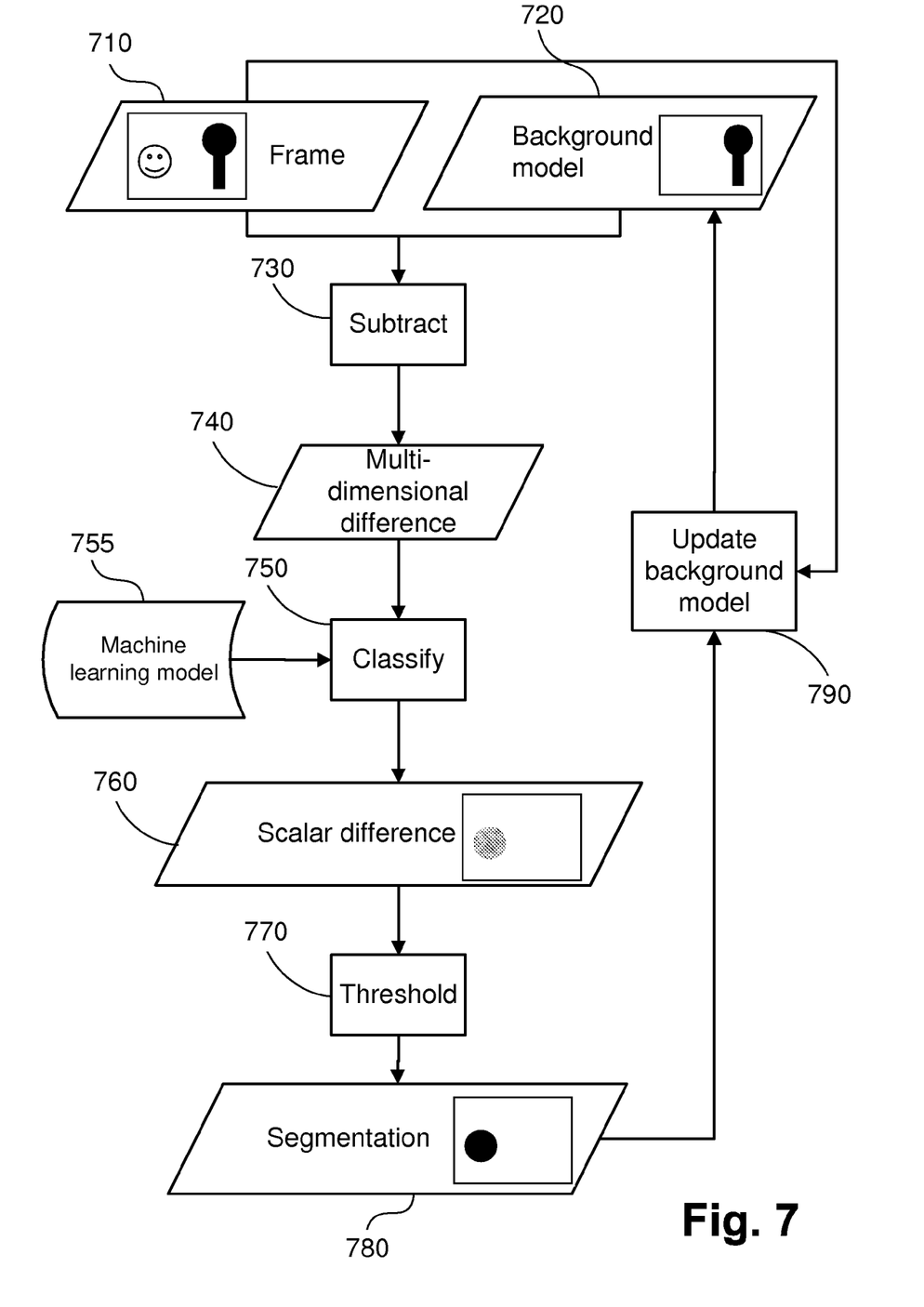
FIG. 7 is a data flow diagram of the classification stage of FIG. 1.

The classification stage 106 is explained in further detail in FIG. 7. A frame 710 is captured and presented to a subtract module 730. A background model 720, which is generated from a set of frames captured at the same scene as frame 710, is also presented to the subtract module 730. The subtract module 730 then subtracts the frame 710 from the background model 720. For example, if the frame 730 and background model 720 are represented as DCT coefficients for 8×8 blocks, the result of the subtract module 730 will be a number of coefficient differences per block. That is, the result is a multi-dimensional difference 740. The multi-dimensional difference is then applied to a classify module 750 740 to produce a scalar difference 760 for the 8×8 block. This is done by applying to the multi-dimensional difference 740 a classifier, such as a Support Vector Machine or Naïve Bayes process, which is trained on training samples derived from a machine learning model 755. The classifier 750 produces a scalar difference 760 which is then thresholded by a threshold module 770. In the module 770, all blocks with a negative value are considered background, and all blocks with a positive value are considered foreground. The result of the threshold module 770 is a foreground/background segmentation 780.

The captured frame 710 is usually used to update the background model 720. However, care should be taken that foreground objects do not become part of the background unintentionally. The segmentation result 780 may be used to prevent or reduce the impact of foreground objects being absorbed in the background model 720. To this end, an update background model module 790 may be used to accept the captured frame 710 and segmentation result 780 as input and to selective updates the background model 720.

In another arrangement, a single value is output from step 180. The value is then used not only to predict the label, but also is an indicator of the confidence of the method 100 that the prediction is correct. A threshold is applied to the value result in a binary classification, so that the visual element is assigned foreground label or a background label. The method 100 ends at step 190. Steps 170 and 180 may be repeated for other frames, or for another region in the same captured frame 160.

Multi-dimensional classification methods, such as method 100, require training examples 110 in order to create a machine learning model 130. Selecting training examples for a multi-dimensional classification method can be a tedious task. Ideally, every visual element in a frame is assigned an accurate label, that is. "background" or "foreground" in the present case. Ideally a large number of frames with diverse content from various locales have to be used in order to successfully train the machine learning model 130. In general, the larger the number of training examples 110, the more accurate is the resulting machine learning model 130.

However, in practice the human effort required to generate the accurate labels is too costly to be practically feasible, especially if the content is acquired at the site where the camera 500 will operate.

To address this problem of providing a sufficient number of training examples 110, low effort human input is combined with a simple (low dimension) foreground separation method (a so-called oracle) that is easy to configure, for the purpose of training the machine learning model 130. The focus is on creating a balanced set of training examples 110. That is, the set of training examples 110 should be biased towards visual elements that cannot be analysed easily with high confidence by the oracle.

Figure 2:
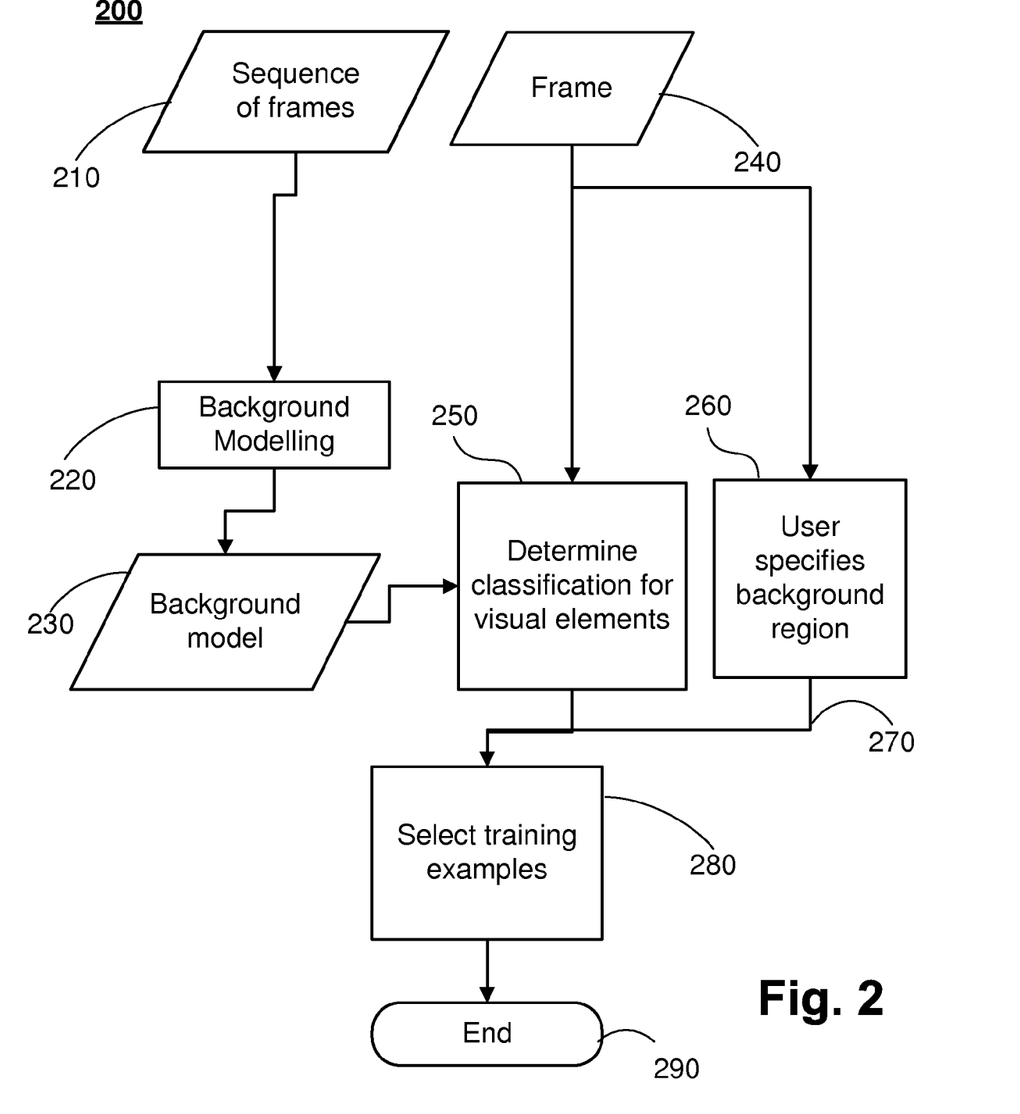
FIG. 2 shows a schematic flow diagram of a method of selecting training examples for use in the method of FIG. 1.

FIG. 2 shows a schematic flow diagram of a method 200 of selecting training examples, with the training examples being used as input 110 in the method 100 described above with reference to FIG. 1. The method 200 starts in step 220 where a sequence of frames 210 is background modelled, to produce or to update a background model 230.

In one arrangement, a running median is used in step 220 to model the background. A number of frames are kept in memory as a history. Preferably the last 8 frames are kept. For each visual element, a value is computed which is the running median of the corresponding visual elements in the history. For example, in the case where pixel intensities are used as visual elements, if the visual element is the pixel at coordinates x=50 and y=20, and the history for pixel intensity values at those coordinates is {100,150,120,130,140,131,141,110}, the resulting median value is 131.

In another example, if the visual element is the block of DCT coefficients in a frame, the median is calculated for each coefficient individually. For example, for a 2×2 block Table 1 shows the history of DCT coefficients.

TABLE 1

| frame | | | | | | | |
|---|---|---|---|---|---|---|---|
| 0 | 1 | 2 | 3 | 4 | 5 | 6 | 7 |
| 1<br>3 | 2<br>4 | 2<br>4 | 1<br>3 | 3<br>4 | 2<br>5 | 1<br>2 | 2<br>3 |
| 1<br>3 | 2<br>2 | 2<br>4 | 1<br>3 | 3<br>4 | 2<br>5 | 1<br>2 | 2<br>4 |

Table 2 shows the median values of the DCT coefficients:

TABLE 2

| Median | |
|---|---|
| 1.5 | 2 |
| 3.5 | 3.5 |

The median value is considered to be representative for the 8 frames, and the best representation of the background, even though it may be a composite value. The background model can be seen as a composite frame of blocks.

In another arrangement, an adaptive background model is used, which updates the modelled value by a weighted average of the previous value and a new incoming value. For the example of a history of 8 intensity values {100,150,120,130, 140,131,141,110}, the background model after the first observation would contain value 100. For an adaptation factor of 0.95, the background model after the second frame would contain value 0.95*100+0.05*150=102.5. For a history of 8 intensity values, the background model value is 110.45. Similarly, adaptive values can be computed for DCT coefficients in blocks. As an example, the history of 8 frames shown in Table 1 results in the adaptive values shown in Table 3.

TABLE 3

| Adaptive | |
|---|---|
| 1.25 | 1.92 |
| 3.08 | 3.88 |

The adaptive background model is resource efficient, but it is initially very much biased to the first value. In one arrangement, it is initialized with the results of a median operation over a number of frames.

After the creation of the background model 230, the background model 230 and a frame 240, which may be part of the sequence 210 or may be an earlier or later recorded frame, are then provided to step 250 where a likelihood is computed for each visual element in frame 240 that that visual element belongs to foreground. The likelihood computation is based on features of the visual elements, such as intensity values or transform coefficients, and on the background model 230.

The part of the background model used is the background plane position corresponding to the location of the visual element in frame 240. Details of computing such a likelihood are described below.

In step 260, a user specifies a background region 270 for frame 240, such that all visual elements in the background region 270 do not contain significant foreground. What is a significant foreground depends on the application domain and the resolution of the image. Visual elements in frame 240 that are not covered by background region 270 may contain foreground or background.

Training examples are then selected in step 280 based on the classifications for visual elements from step 250 and the correspondence of visual elements to background region 270. More details on the selection of training examples are described below. After selection of the training examples in step 280, the method 200 ends in step 290.

Method 200 may be repeated for another frame in the same scene, using the same background model 230, or the method 200 may be performed on a different scene, using a different frame 240 and a different background model 230. In one embodiment, training examples 110 (FIG. 1) are provided to method 100 as soon as such training examples 110 are available. In another embodiment, training examples 110 are provided to method 100 when sufficient examples, e.g. as determined by a threshold, are available.

A training example 110 comprises a label ("background" or "foreground") and a difference tuple which includes information about the difference between the visual element and the corresponding part of the background model 130.

The simple background model 130 that is used in method 200 results in a value indicating the likelihood that a visual element represents foreground or background. In one arrangement, feature values are computed which express the correspondence between visual elements and the values in the background model at corresponding positions in the background plane. For example, if the visual element is an 8 by 8 DCT block in an incoming frame, and the background plane is the same as the plane of the incoming frame, it is compared to the model corresponding to the 8 by 8 DCT block in the background model. Background subtraction can then compute the difference between the two blocks. In one arrangement, the difference is computed by summing the absolute value of the differences for each coefficient. The result is a difference value, expressed in difference units. In another arrangement, the difference is computed by summing the squares of the coefficient differences as illustrated in Table 4.

TABLE 4

| Incoming frame | | Background model | | Absolute difference sum | Squared difference sum |
|---|---|---|---|---|---|
| 1 | 2 | 2 | 4 | 9 | 23 |
| 3 | 4 | 6 | 1 | | |

Figure 3:
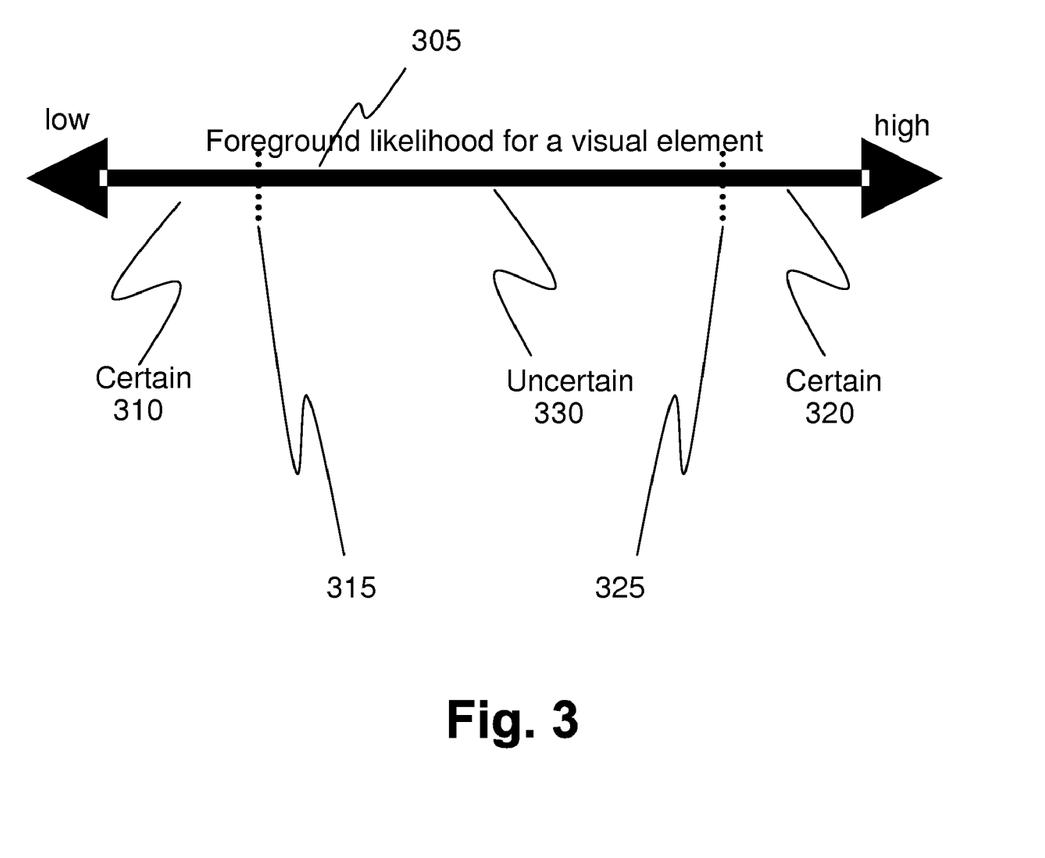
FIG. 3 shows a scale of possible likelihoods that the visual element represents a foreground object.

The difference value is then used as a likelihood that the visual element represents foreground. FIG. 3 shows a scale 305 of possible likelihoods that the visual element represents foreground. Low likelihoods in the range 310 indicate that the visual element is likely to represent the background, whereas high likelihood in the range 320 indicate that the visual element is likely to represent foreground. Ranges 310 and 320 are of type "certain". In a similar manner, midrange 330 likelihoods are of type "uncertain".

In one arrangement, the likelihood value is normalized to a number between 0 and 1 according to the range for values. In the above example, if all coefficients have the same range of values from −127 to +127, the absolute difference sum 9 would be divided by 4*255, and the squared difference sum 23 would be divided by $4*255^2$.

As noted above, the training examples 110 provided as input to the multi-dimensional classification method 100 comprise a difference tuple. Each member of the tuple is a value corresponding to a dimension used in the multi-dimensional classification method 100. In one arrangement, the difference tuple consists of the squared differences between DCT coefficients of a block in the incoming frame 240 and the DCT coefficients of a block in the background model 230. In the example of the 8 by 8 DCT block, the difference tuple is {1, 4, 9, 9}.

Figure 4:
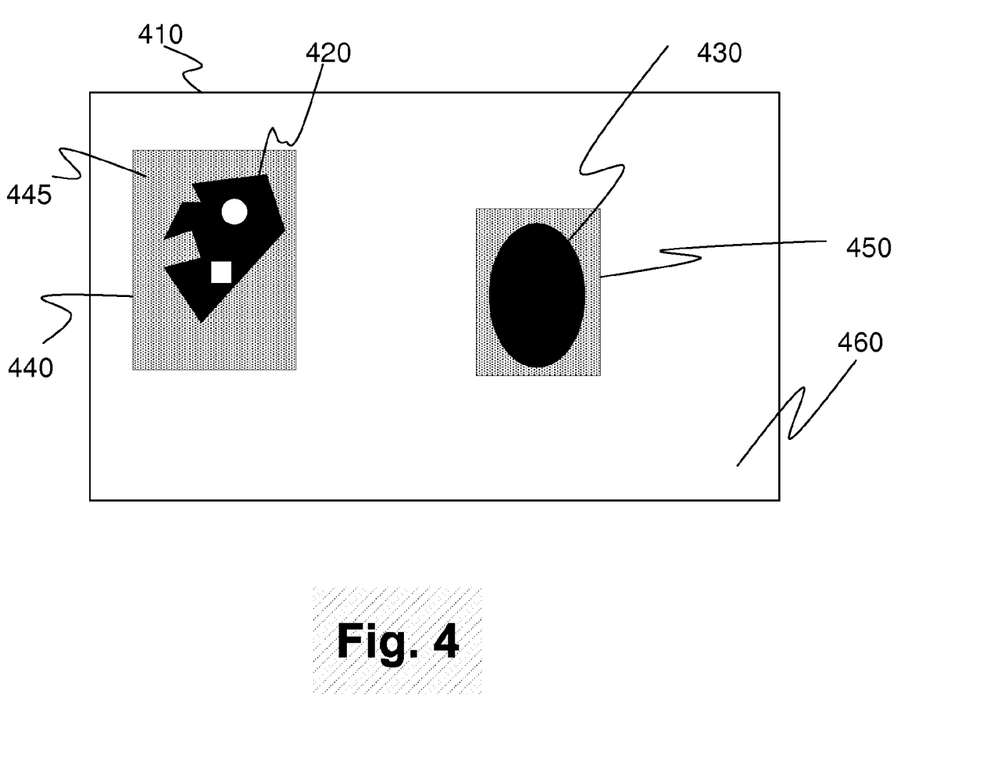
FIG. 4 illustrates the manner in which a user specifies a background region.

Having described the method 100 of separating visual elements appearing in a region of a frame 160 and the method 200 of selecting training examples, the manner in which the user specifies a background region 270 for frame 240 in step 260 is now described in more detail. FIG. 4 illustrates a frame 410 containing significant foreground objects 420 and 430. The user specified the background region for the frame 410 by drawing rectangular bounding boxes 440 and 450 around the significant foreground objects 420 and 430 respectively. The background region 460 is then defined by the exclusion of the bounding boxes 440 and 450.

It is noted that, although the user is asked to make the bounding boxes 440 and 450 as accurate as practically possible, the rectangular bounding boxes 440 and 450 often contain background, such as background 445, particularly when the significant foreground objects 420 and 430 are non-rectangular. It is further noted that most natural objects are non-rectangular. Hence, all visual elements in the background region 460 are considered to represent the background, but not all background visual elements are part of the background region 460 following the selection of the user in step 260.

Although more complex polygons may be used in step 260 to select the background region 270, the principle described above remains. Only very complex polygons will result in accurate outlines of natural objects, but the required user effort to draw such polygons is prohibitive. Therefore, it can be assumed that in practice a bounding box contains both foreground and background elements.

In another arrangement, a user specifies the background region 270 in step 260 by selecting a range of colors or intensities. For example, the user may specify that all visual elements with an intensity below a threshold represent background, while pixels with an intensity above that threshold may represent foreground or background.

Similar, to defining the background region 270 the user may specify foreground region with certainty, and declare the rest of the frame 140 to represent either foreground or background. The same principles as described above apply.

The usual approach in machine learning when an oracle is present, is to select the examples most likely to be correct. The problem with this approach is that the examples are biased towards the visual elements for which a simple background modelling method is sufficient for foreground separation. This is generally not the case in practice.

Method 200 therefore aims to select a balanced set of training examples 110, specifically including training examples containing visual elements that the simple background model cannot classify with high certainty.

To this end, training examples 110 are recruited from those visual elements that have been classified in step 250 as "uncertain". A simple background modelling method is not confident in classifying these visual elements accurately. In one embodiment, a candidate set is created comprising visual elements that do not correspond to the user specified background region 460 and that are classified as "uncertain". Based on the required number of training examples 110, the training examples 110 are selected to include a predetermined number of visual elements classified as "uncertain".

In one arrangement, the difference value may be used to select training examples 110 by employing further thresholds or weighing the probability that an example is selected. For example, in one embodiment, a selection cut-off is employed based on the number of selected examples. In another embodiment, a minimum distance threshold is used.

In another embodiment, training examples 110 are selected based on the distance of an "uncertain" visual element to a "certain" visual element or a visual element in the background region. Two strategies may be employed to deal with the situation where an example is selected with the wrong label: risk-averse and diversity-oriented.

In one arrangement, a risk-averse strategy is employed. Given that the candidate set from which training examples 110 are to be selected can't be labelled correctly with certainty, the risk-averse strategy tries to make use of information about those visual elements that are considered certain. These are the visual elements which are "certain" to represent foreground or background according to thresholding operations on the foreground likelihood, and the visual elements which are in the background region 460. Training examples 110 are then selected and labelled based on the likelihood that such visual elements belong to a class, their proximity to visual elements that are considered to be certain to belong to that class, and their distance to visual elements that are considered to be certain to not belong to that class. In one arrangement, the visual elements in the candidate set are ranked as described below, and the top ranking visual elements are selected as training examples 110.

In one arrangement, first a normalized absolute difference value is computed as a foreground likelihood for a visual element. A lower and an upper threshold are used to separate "certain" from "uncertain" classifications. Values below the lower threshold are considered "certain" background visual elements, and values above the upper threshold are considered "certain" foreground visual elements. For an "uncertain" visual element, a decision is made whether it is a potential foreground or background example. If the value is closest to the upper threshold, the associated visual element is a potential foreground example with a classification likelihood equal to the foreground likelihood, otherwise it is a potential background example with a classification likelihood equal to 1 minus the foreground likelihood. A neighbour likelihood is then computed, which reflects the distance between that visual element and members of the same class and members of the other class. For potential foreground examples, the spatial distance $d_B$ to the nearest "certain" background visual element or visual element in the background region is computed, e.g. using Euclidean distance or city block distance. Next, the spatial distance $d_F$ to the nearest "certain" foreground visual element is computed. The neighbour likelihood is then computed by dividing $d_B$ by $d_F$. A similar neighbour likelihood is computed for potential background examples.

A score is then computed for a visual element in the candidate set by multiplying the neighbour likelihood with the classification likelihood, and the candidate set is ranked accordingly, where the highest score corresponds to the best candidate for the risk-averse strategy.

In another arrangement, a diversity-oriented strategy is followed. The diversity-oriented strategy tries to select examples from the candidate set which are on the edge, because those are the most valuable for training. Compared to the risk-averse strategy, there is a higher risk of labelling examples incorrectly. The strategy is implemented by computing the neighbourhood likelihood as described above, and computing as a score the absolute value of the difference between the neighbourhood likelihood and 1 (where the value 1 means that a visual element is equally close to background and foreground visual elements). The scores are then ranked accordingly, where the lowest score corresponds to the best candidate for this strategy.

Figure 5:
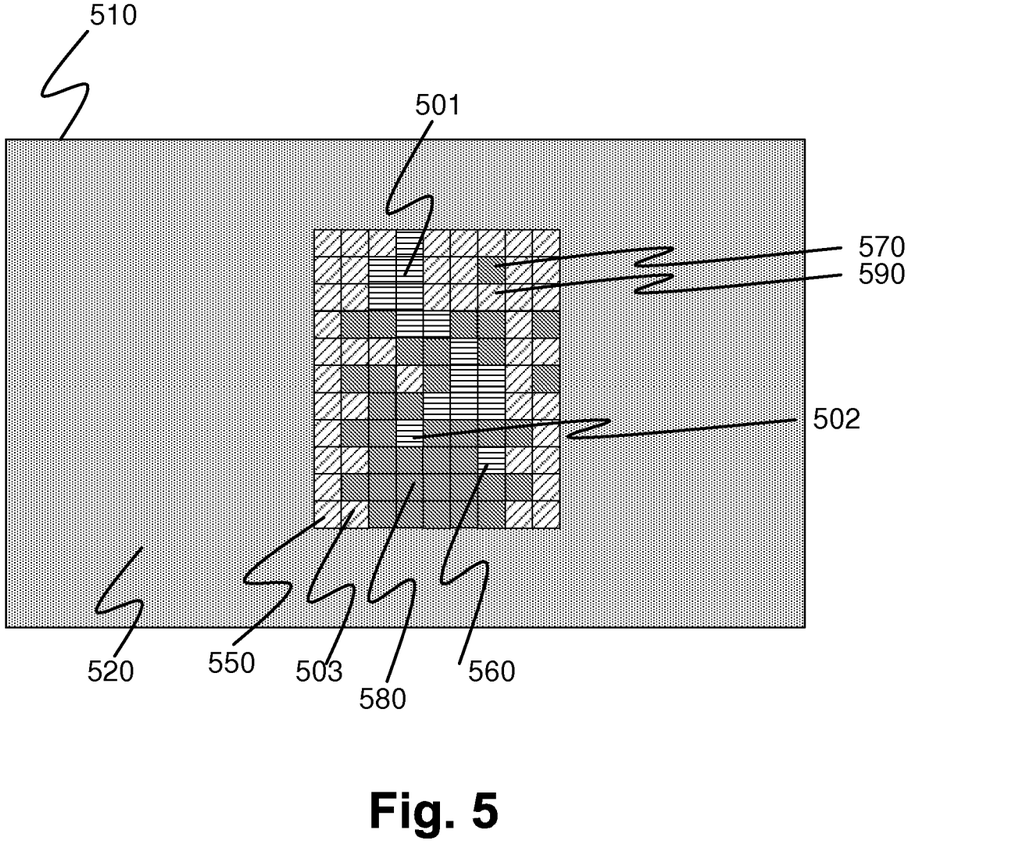
FIG. 5 illustrates the use of spatial relationships to select training examples.

The use of spatial relationships to select training examples 110 is illustrated by way of example. FIG. 5 shows a frame 510 having a background region 520 is specified by a user in step 260. The visual elements excluded from the background region 520 include "certain" background visual elements 550, "certain" foreground visual elements 560, and "uncertain" visual elements 580. Let the lower threshold of foreground likelihood be 0.25 and let the upper threshold be 0.8 in the example case. Let the visual element 570 have a foreground likelihood of 0.45, and let the visual element 580 have a foreground likelihood of 0.75.

The city block distance between "uncertain" visual element 570 and the closest "certain" background visual element 590 is 1. The city block distance between "uncertain" visual element 570 and the closest "certain" foreground visual element 501 is 3. Employing the risk-averse strategy, the neighbourhood likelihood is 3 divided by 1, resulting in 3. As the foreground likelihood (0.45) of "uncertain" visual element 570 is closest to the lower threshold, the classification likelihood is 1−0.45=0.55. The score is then 3*0.55=1.65.

The city block distance between "uncertain" visual element 580 and the closest "certain" foreground visual element 502 is 2. The city block distance between "uncertain" visual element 580 and the closest "certain" background visual element 503 is 3. Employing the risk-averse strategy, the neighbourhood likelihood is 2 divided by 3, resulting in 0.67. As the foreground likelihood 0.75 is closest to the upper threshold, the classification likelihood is 0.75. The score is then 0.67*0.75=0.5.

The example shows that the risk of selecting visual element 570 as a training example is lower than selecting visual element 580, even though the latter visual element has a foreground likelihood that is closer to a threshold.

In one arrangement, the input values for computing the score may be scaled. For example, a square root is applied to the neighbour likelihood so that the values are in a more compact range.

The result of foreground/background separation is the labelling of a visual element as foreground or background. The results for a number of visual elements are then used to do further analysis of a video. For example, foreground object detection may be done by doing connected component analysis to group foreground visual elements. An area threshold may then be applied to distinguish significant objects from insignificant objects and noise.

The foregoing describes only some embodiments of the present invention, and modifications and/or changes can be made thereto without departing from the scope and spirit of the invention, the embodiments being illustrative and not restrictive.

We claim:

1. A method of classifying elements in blocks within a frame of a set of frames, said method comprising the steps of:
creating a background model for a block based on a statistical function applied to features of elements for the block in the set of frames, the background model being represented as a plurality of Discrete Cosine Transform (DCT) coefficients for the block;
receiving a mapping of features to labels indicating whether data for the block in a set of frames corresponds to foreground or background;
calculating a difference measure comprising a plurality of DCT coefficient difference values based on features of an element for the block within the frame and features of the background model, the frame being represented as DCT coefficients;
classifying the element for the block within the frame into foreground or background based upon the difference measure and the mapping; and
updating the background model using the frame represented as DCT coefficients.

2. A method according to claim 1, wherein the features are transform coefficients.

3. A method according to claim 1, wherein the features are a plurality of Discrete Cosine Transform (DCT) coefficients.

4. A method according to claim 1, wherein the mapping is formed by a multi-dimensional classifier.

5. A method according to claim 1, wherein said classification step comprises the steps of:
calculating a confidence measure for the element to belong to at least one of foreground and background based upon the difference measure and the mapping; and
classifying the element based upon the confidence measure.

6. A method according to claim 1, wherein said creating step comprises considering respective positions of the block in the set of frames, said method further comprising the steps of:
receiving from a user a selection of elements in a set that are certain to belong to one of foreground and background;
determining a classification for elements in the set excluded from the selection based on features of the elements excluded from the selection and the background model; and
selecting at least elements in the set with a low likelihood of accurate classification as training examples.

7. A method according claim 6, wherein said selecting step includes selecting elements with a high likelihood of accurate classification.

8. A method according to claim 6, wherein, in said receiving step, the set comprises elements in frames for at least one block, the elements being certain and uncertain to belong to one of background and foreground, and the selection of elements being elements in the set excluding the elements in the frames for the at least one block.

9. A method according to claim 6, wherein an accuracy of determining the classification is based on thresholds.

10. A method according to claim 1, wherein said creating step comprises considering respective positions of the block in the set of frames, the method further comprising selecting at least elements with a low likelihood of accurate classification to belong to one of foreground and background as training examples based upon a spatial relationship between one or more of elements with a high likelihood of accurate classification and the selected elements.

11. An apparatus for classifying elements in blocks within a frame of a set of frames, said apparatus comprising:
at least a processor and memory, cooperating to function as:
a unit which creates a background model for a block based on a statistical function applied to features of elements for the block in the set of frames, the background model being represented as a plurality of Discrete Cosine Transform (DCT) coefficients for the block;

a unit which receives a mapping of features to labels indicating whether data for the block in a set of frames belong to foreground or background;

a unit which calculates a difference measure comprising a plurality of DCT coefficient difference values based on features of an element for the block within the frame and features of the background model, the frame being represented as DCT coefficients;

a unit which classifies the element for the block within the frame into foreground or background based upon the difference measure and the mapping; and an updating unit which updates the background model using the frame represented as DCT coefficients.

12. An apparatus according to claim 11, wherein said unit which creates the background model for the block comprises a unit which considers respective positions of the block in the set of frames, and wherein said at least a processor and memory further cooperating to function as:

a unit which receives from a user a selection of elements in a set that are certain to belong to one of foreground and background;

a unit which determines a classification for elements in the set excluded from the selection based on features of the elements excluded from the selection and background model; and a unit which selects at least elements in the set with a low likelihood of accurate classification as training examples.

13. A method of classifying elements in blocks within a frame of a set of frames, said method comprising the steps of:

creating a background model for a block based on a statistical function applied to features of elements for the block in the set of frames, the background model being represented as a plurality of Discrete Cosine Transform (DCT) coefficients for the block, wherein said creating step comprises considering respective positions of the block in the set of frames;

receiving a mapping of features to labels indicating whether data for the block in a set of frames corresponds to foreground or background;

calculating a difference measure comprising a plurality of DCT coefficient difference values based on features of an element for the block within the frame and features of the background model, the frame being represented as DCT coefficients;

classifying the element for the block within the frame into foreground or background based upon the difference measure and the mapping;

updating the background model using the frame represented as DCT coefficients;

receiving from a user a selection of elements in a set that are certain to belong to one of foreground and background;

determining a classification for elements in the set excluded from the selection based on features of the elements excluded from the selection and the background model; and selecting at least elements in the set with a low likelihood of accurate classification as training examples based upon a spatial relationship between one or more of elements with a high likelihood of accurate classification and the selected elements.

* * * * *